United States Patent
Armelin et al.

(10) Patent No.: US 11,972,334 B2
(45) Date of Patent: Apr. 30, 2024

(54) METHOD AND APPARATUS FOR GENERATING A COMBINED ISOLATION FOREST MODEL FOR DETECTING ANOMALIES IN DATA

(71) Applicant: Sony Corporation, Tokyo (JP)

(72) Inventors: Gabriel Armelin, Stuttgart (DE); Erbin Lim, Stuttgart (DE); Francesco Cartella, Stuttgart (DE); Gert Ceulemans, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 932 days.

(21) Appl. No.: 16/991,037

(22) Filed: Aug. 12, 2020

(65) Prior Publication Data
US 2021/0049517 A1   Feb. 18, 2021

(30) Foreign Application Priority Data

Aug. 13, 2019  (EP) .................................... 19191523

(51) Int. Cl.
*G06N 20/20* (2019.01)
*G06F 16/215* (2019.01)

(52) U.S. Cl.
CPC ............ *G06N 20/20* (2019.01); *G06F 16/215* (2019.01)

(58) Field of Classification Search
CPC .............................. G06N 20/20; G06F 16/215
See application file for complete search history.

(56) References Cited

U.S. PATENT DOCUMENTS

| | | | |
|---|---|---|---|
| 10,392,022 B1* | 8/2019 | Rau | B60W 40/09 |
| 2017/0091652 A1* | 3/2017 | Miao | G06N 20/20 |
| 2017/0279828 A1 | 9/2017 | Savalle et al. | |
| 2018/0041528 A1 | 2/2018 | Machlica et al. | |
| 2018/0260531 A1* | 9/2018 | Nori | G06N 20/20 |
| 2019/0005398 A1* | 1/2019 | Zheng | G06F 16/335 |
| 2021/0136098 A1* | 5/2021 | Stergioudis | G06N 20/10 |

FOREIGN PATENT DOCUMENTS

| | | | | |
|---|---|---|---|---|
| CN | 108900476 A | * | 11/2018 | ......... H04L 63/1425 |
| CN | 109145030 A | * | 1/2019 | ........... G06K 9/6259 |
| CN | 109871886 A | * | 6/2019 | |

(Continued)

OTHER PUBLICATIONS

Liu, F. T., et al., "Isolation Forest," IEEE International Conference on Data Mining, IEEE, Pisa, Italy, 2008, 10 pages.

(Continued)

*Primary Examiner* — Shahid K Khan
(74) *Attorney, Agent, or Firm* — XSENSUS LLP

(57) ABSTRACT

A method for generating a combined Isolation Forest model for detecting anomalies in data is provided. The method includes receiving a first Isolation Forest model for detecting anomalies in data from a first electronic device. The first Isolation Forest model is trained at the first electronic device. Further, the method includes receiving a second Isolation Forest model for detecting anomalies in data from a second electronic device. The second Isolation Forest model is trained at the second electronic device. The method additionally includes combining the first Isolation Forest model and the second Isolation Forest model to obtain the combined Isolation Forest model.

16 Claims, 4 Drawing Sheets

(56) References Cited

FOREIGN PATENT DOCUMENTS

| CN | 109873812 A | * | 6/2019 | | |
|---|---|---|---|---|---|
| CN | 109919186 A | * | 6/2019 | | |
| WO | 2016/118813 A1 | | 7/2016 | | |
| WO | 2018/004580 A1 | | 1/2018 | | |
| WO | WO-2018004580 A1 | * | 1/2018 | ........... | G06F 15/163 |
| WO | WO-2018140014 A1 | * | 8/2018 | ........... | G06T 7/0012 |
| WO | WO-2019129977 A1 | * | 7/2019 | | |

OTHER PUBLICATIONS

Timčenko, V., and Gajin, S., "Machine Learning based Network Anomaly Detection for IoT environments," Mar. 2018, 6 pages.

* cited by examiner

METHOD AND APPARATUS FOR GENERATING A COMBINED ISOLATION FOREST MODEL FOR DETECTING ANOMALIES IN DATA

CROSS-REFERENCE TO RELATED APPLICATION

The present application claims priority to European Patent Application 19191523.0 filed by the European Patent Office on Aug. 13, 2019, the entire contents of which being incorporated herein by reference.

FIELD

The present disclosure relates to detection of anomalous activities at electronic devices. In particular, examples relate to a method and an apparatus for generating a combined Isolation Forest model for detecting anomalies in data. Further examples relate an electronic device and a system comprising multiple electronic devices.

BACKGROUND

Anomaly detection is the challenge of finding anomalies in data of a device or system. Anomalies are data patterns that do not conform to a well-defined notion of normal behavior of the device or system. Finding anomalies is important since the anomalies may represent significant events for a huge variety of applications. For example, anomalies may be caused by frauds in financial systems, hacker intrusions in a computer or a computer network, enemy activities in military surveillance systems, etc.

Conventional approaches detect anomalies at either a centralized server or in a centralized network of servers. Therefore, it is necessary to transfer data from individual monitored devices to the detection servers. The conventional approaches gather data from several monitored devices into a cluster of servers, perform some data pre-processing and create features to be used by machine learning models for detection of anomalies. However, these approaches do no scale well when the number of monitored devices is large and increasing continuously. Further, the cost of infrastructure (computing and storage servers, redundant servers, computer networks) is high. Additionally, data privacy concerns as well as security concerns exist.

Other conventional approaches perform model training on the server side and classification of events on the device side. However, also these conventional approaches require transfer of data from the monitored device to the server for model training. Therefore, data privacy concerns as well as security concerns exist also for these conventional approaches.

Hence, there is a desire for improved generation of machine learning models for detecting anomalies in data.

SUMMARY

This desire is met by apparatuses and methods in accordance with the independent claims. Advantageous embodiments are addressed by the dependent claims.

According to a first aspect, the present disclosure provides a method for generating a combined Isolation Forest model for detecting anomalies in data. The method comprises receiving a first Isolation Forest model for detecting anomalies in data from a first electronic device. The first Isolation Forest model is trained at the first electronic device. Further, the method comprises receiving a second Isolation Forest model for detecting anomalies in data from a second electronic device. The second Isolation Forest model is trained at the second electronic device. The method additionally comprises combining the first Isolation Forest model and the second Isolation Forest model to obtain the combined Isolation Forest model.

According to a second aspect, the present disclosure provides a method for an electronic device. The method comprises training a first Isolation Forest model for detecting anomalies in data. Further, the method comprises transmitting the trained first Isolation Forest model to another electronic device. The method comprises receiving from the other electronic device a combined Isolation Forest model for detecting anomalies in data. The combined Isolation Forest model is a combination of the first Isolation Forest model and at least a second Isolation Forest model for detecting anomalies in data. Additionally, the method comprises analyzing data at the electronic device for anomalies using the combined Isolation Forest model.

According to a third aspect, the present disclosure provides an apparatus for generating a combined Isolation Forest model for detecting anomalies in data. The apparatus comprises an input interface configured to receive a first Isolation Forest model for detecting anomalies in data from a first electronic device. The first Isolation Forest model is trained at the first electronic device. Further, the input interface is configured to receive a second Isolation Forest model for detecting anomalies in data from a second electronic device. The second Isolation Forest model is trained at the second electronic device. The apparatus further comprises a processing circuit configured to combine the first Isolation Forest model and the second Isolation Forest model to obtain the combined Isolation Forest model.

According to a fourth aspect, the present disclosure provides an electronic device. The electronic device comprises a processing circuit configured to train a first Isolation Forest model for detecting anomalies in data. Further, the electronic device comprises an output interface configured to transmit the trained first Isolation Forest model to another electronic device. The electronic device additionally comprises an input interface configured to receive from the other electronic device a combined Isolation Forest model for detecting anomalies in data. The combined Isolation Forest model is a combination of the first Isolation Forest model and at least a second Isolation Forest model for detecting anomalies in data. The processing circuit is further configured to analyze data at the electronic device for anomalies using the combined Isolation Forest model.

According to a fifth aspect, the present disclosure provides a system. The system comprises a first electronic device comprising a first processing circuit configured to train a first Isolation Forest model for detecting anomalies in data. Further, the system comprises a second electronic device comprising a second processing circuit configured to train a second Isolation Forest model for detecting anomalies in data. The system additionally comprises a third electronic device comprising an input interface configured to receive the first Isolation Forest model from the first electronic device and the second Isolation Forest model from the second electronic device. The third electronic device further comprises a third processing circuit configured to combine the first Isolation Forest model and the second Isolation Forest model to obtain a combined Isolation Forest model. Additionally, the third electronic device comprises an output interface configured to transmit the combined Isolation Forest model to the first electronic device and the second electronic device. At least one of the first processing circuit and the second processing circuit is configured to analyze data at the respective electronic device for anomalies using the second Isolation Forest model.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
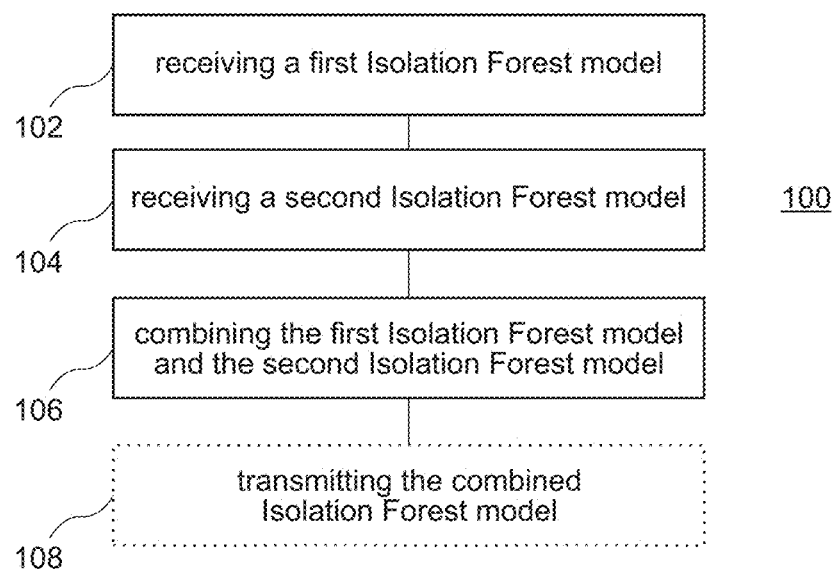
FIG. 1 illustrates a flowchart of an example of a method for generating a combined Isolation Forest model for detecting anomalies in data.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a", "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises", "comprising", "includes" and/or "including", when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Isolation Forest is an unsupervised machine learning model proposed by F. Liu et al. in their paper "Isolation Forest", 2008 Eighth IEEE International Conference on Data Mining, ISBN: 978-0-7695-3502-9, which is hereby incorporated by reference. The Isolation Forest model distinguishes normal from abnormal instances based on two assumptions: 1) Anomalies are the minority and consist of fewer instances in comparison to normal instances; and 2) Anomalies have attribute values that are very different from those of normal instances. If the two above assumptions are met, anomaly instances have short path lengths. The path length is the number of decisions or branches traversed from a root node to an end (external) node of an isolation (decision) tree. In other words, anomalies are located closer to the root of the tree than normal instances. Accordingly, when a forest of trees produces short path lengths for some particular data points, these data points are highly likely to be or to relate to anomalies.

FIG. 1 illustrates a flowchart of an example of a method 100 for generating a combined (unified) Isolation Forest model for detecting anomalies in data.

Method 100 comprises receiving 102, from a first electronic device, a first Isolation Forest model for detecting anomalies in data. The first Isolation Forest model is trained at the first electronic device using only local data of the first electronic device (e.g. data available only to the first electronic device).

Further, method 100 comprises receiving 102, from a second electronic device, a second Isolation Forest model for detecting anomalies in data. The second Isolation Forest model is trained at the second electronic device using only local data of the second electronic device (e.g. data available only to the second electronic device).

The first electronic device and the second electronic device may be any physical entity comprising electronic circuitry capable of exchanging data with one or more communication networks such as a Local Area Network (LAN), a Wireless LAN (WLAN), a Metropolitan Area Network (MAN), a Wide Area Network (WAN), a Global Area Network (GAN) or the Internet. The electronic device may comprise further circuitry—conventional and/or custom. For example, the first electronic device and the second electronic device may be an Internet-of-Things (IoT) device. An IoT device is an electronic device that is capable of connecting to the Internet, and to receive, transmit and process data.

Further, method 100 comprises combining 106 the first Isolation Forest model and the second Isolation Forest model to obtain the combined Isolation Forest model. In other words, the first Isolation Forest model and the second Isolation Forest model are merged/fused to obtain the combined Isolation Forest model.

Each of the first Isolation Forest model, the second Isolation Forest model and the combined Isolation Forest model may be represented by a corresponding algorithm (data structure).

According to method 100, the model training is split into two phases. In a first phase, a respective Isolation Forest model is trained at each electronic device using data available only to that device. The training of the respective Isolation Forest model at each electronic device may be done as described in the paper of Liu et al. The individual Isolation Forest model are therefore capable of detecting anomalies for patterns learnt from the respective data set available at the electronic device. However, the individual Isolation Forest models are not able to generalize to additional patterns captured at other devices because they only learn patterns based on their respective local data set. This is exemplarily illustrated in FIG. 2.

At a first electronic device 210, a first set of data points 211 is available. Training the Isolation Forest model at the first electronic device 210 using the first set of data points 211 results in the first Isolation Forest model 213 comprising a first plurality of trained decision (isolation) trees.

At a second electronic device 220, a different second set of data points 221 is available. Training the Isolation Forest model at the second electronic device 220 using the second set of data points 221 results in the second Isolation Forest model 223 comprising a different second plurality of trained decision (isolation) trees.

Since the Isolation Forest models are trained using different sets of data points at the electronic devices 210 and 220, the resulting trained Isolation Forest models 213 and 223 are capable of detecting different types of anomalies. For example, the first Isolation Forest model 213 is capable of detecting a first type of anomalies 212, whereas the second Isolation Forest models 223 is capable of detecting a different second type of anomalies 222.

Method 100 extends the first training phase at the electronic devices 210 and 220 by a second training phase. The second training phase continues the training phase started at the electronic devices 210 and 220 by combining the locally learnt Isolation Forest models 213 and 223 into the combined Isolation Forest models 231, i.e. a universal or unified Isolation Forest model. Combining the locally learnt Isolation Forest models 213 and 223 allows to transfer knowledge between the electronic devices 210 and 220.

Figure 2:
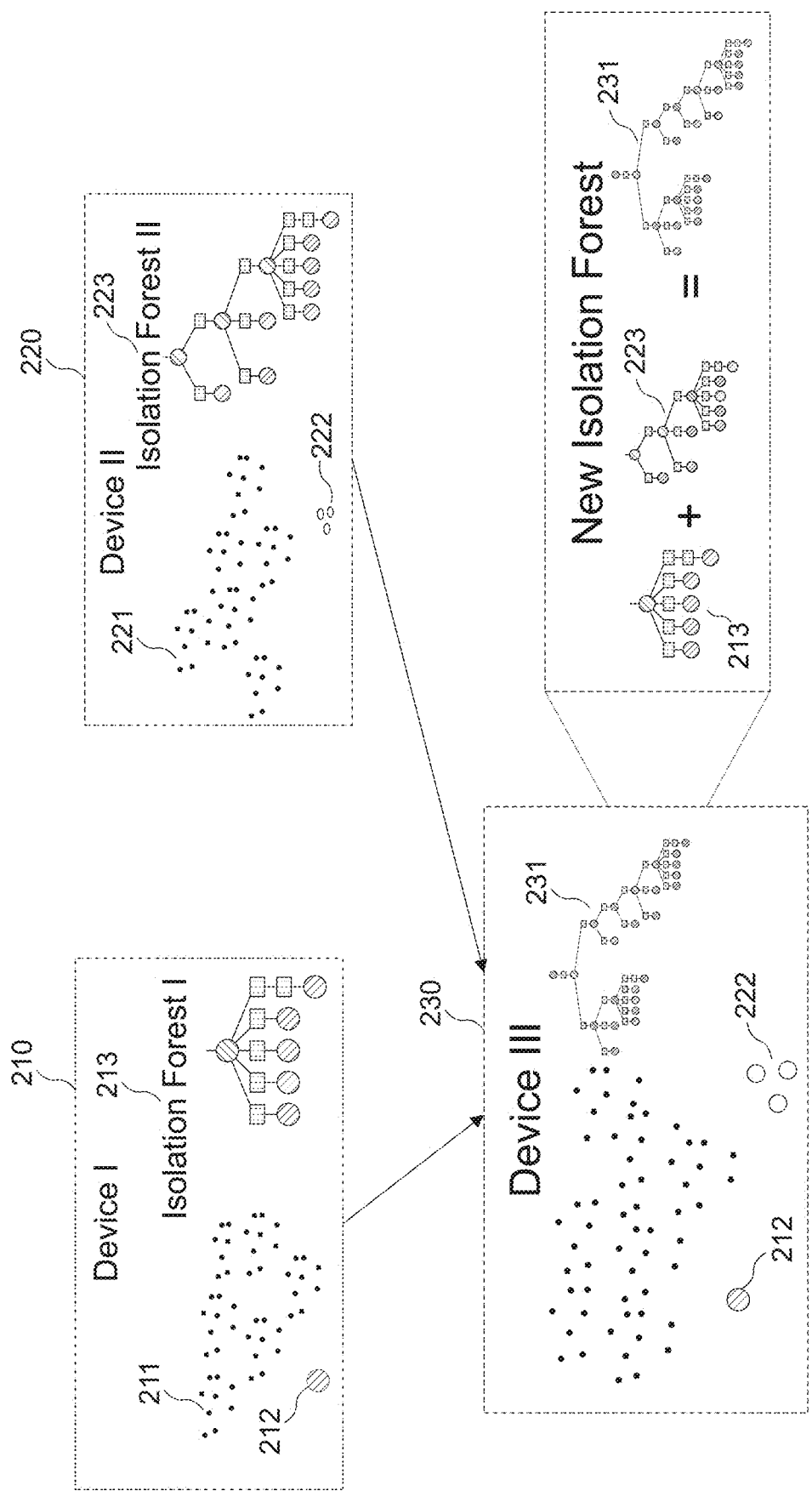
FIG. 2 illustrates an exchange of Isolation Forest models between devices.

In the second training phase, the electronic devices 210 and 220 share their trained Isolation Forest models 213 and 223 with another (third) electronic device 230 (e.g. a server, a server network such as a cloud infrastructure, or peers of IoT devices) which creates the combined Isolation Forest model 231. As indicated in FIG. 2, combined Isolation Forest model 231 is a combination of the incoming trained Isolation Forest models 213 and 223.

The combined Isolation Forest model 231 is more generic than the individual Isolation Forest models 213 and 223 trained at the electronic devices 210 and 220. Accordingly, the combined Isolation Forest model 231 is capable of detecting (identifying) more types of anomalies in data than the individual Isolation Forest models 213 and 223. In the example of FIG. 2, the combined Isolation Forest model 231 is capable of detecting both the first type of anomalies 212 and the second type of anomalies 222. The combined Isolation Forest model 231 is, hence, able to detect more anomalies than each of the first Isolation Forest model 213 and the second Isolation Forest model 223 alone.

Further, it is to be noted that only the forests of decision trees are transferred between the electronic devices 210, 220 and 230. There is no need to send any user data out of one of the electronic devices 210 and 220. Accordingly, no user data is transferred during execution of method 100 such that user data privacy concerns may be omitted. Therefore, less concerns and obligations about user data protection and privacy may be enabled. The Isolation Forest model 213, 223 and 231 consist of a set of compact rules for classifying instances. Therefore, the amount of transferred information (data) between the electronic devices 210, 220 and 230 is reduced compared to transferring an entire data set like in conventional approaches. In addition, method 100 is a scalable and cost-effective solution because part of the processing takes place at the electronic devices 210 and 220 (e.g. IoT devices). Further, since Isolation Forest is an unsupervised machine learning model, no human intervention for data labelling is needed.

According to examples, method 100 additionally comprises transmitting 108 the combined Isolation Forest model to at least one of the first electronic device and the second electronic device. For example, the combined Isolation Forest model may be shared to all electronic devices in the network such that they can use the combined Isolation Forest model for classification of data instances. In the example of FIG. 2, the first electronic device 210 may analyze data at the electronic device 210 for anomalies using the combined Isolation Forest model 231.

Although the examples described above in connection with FIGS. 1 and 2 combine a first and a second Isolation Forest model individually trained at a first and a second electronic device, it is to be noted that method 100 may in general combine any number N≥2 of Isolation Forest models individually trained at a respective electronic device in order to obtain a combined Isolation Forest model.

As described above, the first Isolation Forest model represents a first plurality of trained decision trees, and the second Isolation Forest model represents a second plurality of trained decision trees. When performing the step of combining 106 the first Isolation Forest model and the second Isolation Forest model, one or more tree operations (algorithms) may be applied. Some exemplary tree operations will be described in the following.

In some examples, combining 106 the first Isolation Forest model and the second Isolation Forest model may comprise merging the first plurality of trained decision trees and the second plurality of trained decision trees. Accordingly, the combined Isolation Forest model comprises the first plurality of trained decision trees and the second plurality of trained decision trees.

Additionally or alternatively, combining 106 the first Isolation Forest model and the second Isolation Forest model may comprise compacting at least one of the first plurality of trained decision trees and the second plurality of trained decision trees. Accordingly, more compact versions of the first plurality of trained decision trees and/or the second plurality of trained decision trees may be obtained such that the combined Isolation Forest model may be more compact.

Further additionally or further additionally, combining 106 the first Isolation Forest model and the second Isolation Forest model may comprise pruning at least one of the first plurality of trained decision trees and the second plurality of trained decision trees. By removing sections of the decision trees that provide little power to classify instances, the size of the decision trees may be reduced. Accordingly, the size of the combined Isolation Forest model may be reduced.

In some examples, combining 106 the first Isolation Forest model and the second Isolation Forest model may comprise searching for redundancies in the first plurality of trained decision trees and the second plurality of trained decision trees. For example, redundant trees or redundant tree branches may be searched. Combining 106 the first Isolation Forest model and the second Isolation Forest model may then further comprise removing found redundancies from the first plurality of trained decision trees and the second plurality of trained decision trees. Accordingly, redundant parts of the first plurality of trained decision trees and the second plurality of trained decision trees may be omitted in the combined Isolation Forest model.

According to some examples, combining 106 the first Isolation Forest model and the second Isolation Forest model may comprise calculating path lengths for paths from root nodes to end (external) nodes of the first plurality of trained decision trees and the second plurality of trained decision trees. Further, combining 106 the first Isolation Forest model and the second Isolation Forest model may comprise calculating statistics indicative of a relevance of a respective path for paths exhibiting a path length shorter than a threshold value (e.g. the threshold value may depend on the anomalies to be detected by the combined Isolation Forest model). The statistics may, e.g., be a median, a standard deviation, a probability distribution, etc., or a combination thereof. Only the paths for which the statistics indicates that the respective path is relevant may be used for the combined Isolation Forest model. In other words, a path length analysis may be performed on the incoming trees of the first and the second Isolation Forest model. As described above, statistics may be computed for the short path lengths as selection criterion for deciding which ones are relevant or not in order to only include the relevant ones into the combined Isolation Forest model. The above processing may allow filtering out nodes far away from the root node of a tree. As described above, anomalies have short path lengths. Therefore, omitting long paths in the combined Isolation Forest model may allow obtaining a compact Isolation Forest model.

Figure 3:
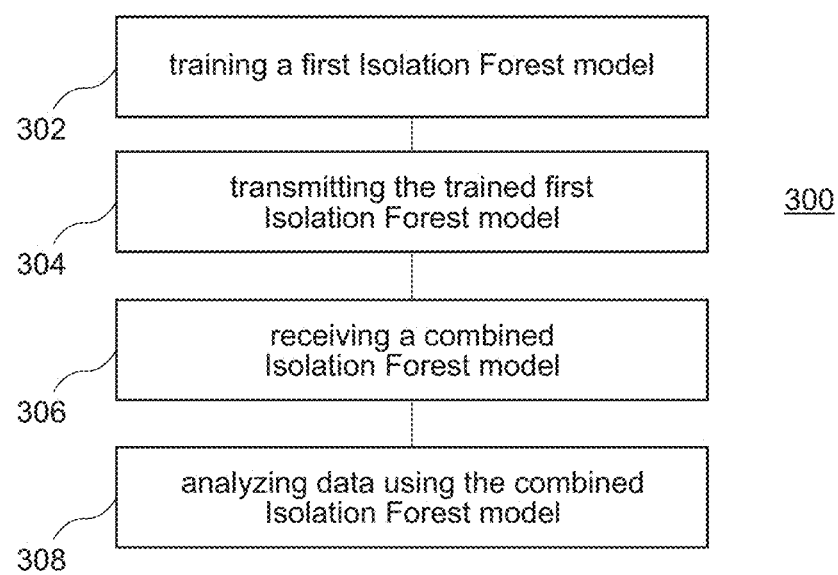
FIG. 3 illustrates an example of a method for an electronic device.

In order to highlight the processing in the electronic devices training the individual Isolation Forest models as described above, FIG. 3 illustrates a flow chart of a method 300 for an electronic device (e.g. an IoT device) that focusses on the method steps performed by the respective electronic device. Method 300 is performed by each of the electronic devices.

Method 300 comprises training 302 a first Isolation Forest model for detecting anomalies in data (e.g. as described in the paper of Liu et al.). The first Isolation Forest model is trained at the electronic device using only local data of the electronic device (e.g. data available only to the first electronic device).

Further, method 300 comprises transmitting 304 the trained first Isolation Forest model to another (an external) electronic device such as a server or a server network (e.g. a cloud infrastructure).

Method 300 additionally comprises receiving 306 from the other electronic device a combined Isolation Forest model for detecting anomalies in data. As described above, the combined Isolation Forest model is a combination of the first Isolation Forest model and at least a second Isolation Forest model for detecting anomalies in data.

In addition, method 300 comprises analyzing 308 data at the electronic device for anomalies using the combined Isolation Forest model. For example, the data at the electronic device are classified using the combined Isolation Forest model in order to detect anomalies in the data. Since the combined Isolation Forest model is more generic than the first Isolation Forest model trained at the electronic device, the electronic device is capable of detecting more types of anomalies in data. Further, the electronic device is not required to send user data to the other electronic device for obtaining the more generic combined Isolation Forest model.

Figure 4:
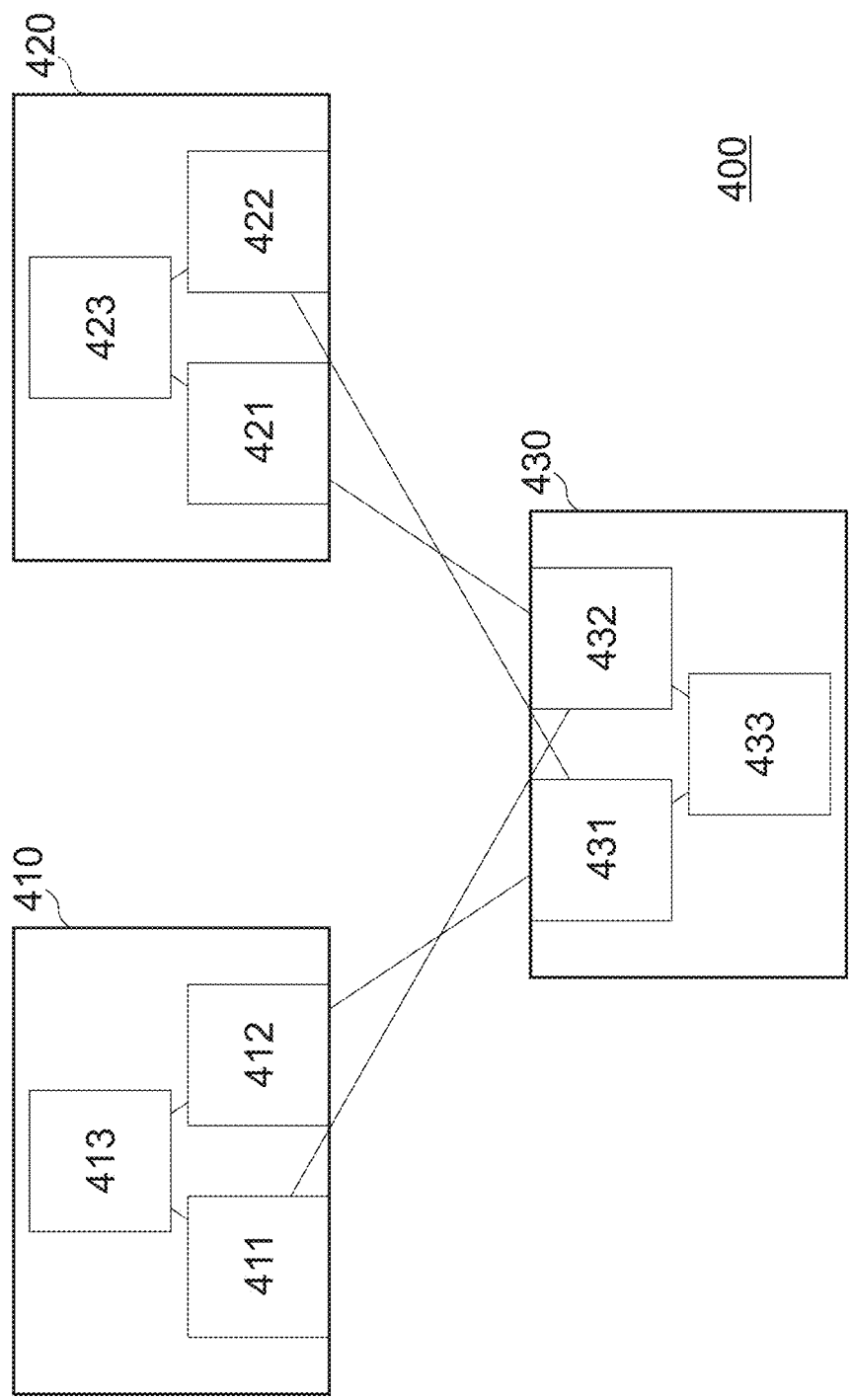
FIG. 4 illustrates an example of a system.

An example of an electronic system 400 for applying the proposed technique is illustrated in FIG. 4. The system 400 comprises a first electronic device 410, a second electronic device 420 and a third electronic device 430. For example, the first electronic device 410 and the second electronic device 420 may be IoT devices. The third electronic device 430 may, e.g., be a server or a server network. The first electronic device 410, the second electronic device 420 and the third electronic device 430 are communicatively coupled via a communication network such as e.g. a LAN, a WLAN, a MAN, a GAN or the Internet.

The first electronic device 410 comprises a first processing circuit 413 configured to train a first Isolation Forest model for detecting anomalies in data based on local data of the first electronic device 410 as described above. Similarly, the second electronic device 420 comprises a second processing circuit 423 configured to train a second Isolation Forest model for detecting anomalies in data based on local data of the second electronic device 420.

The first electronic device 410 comprises an output interface 411 configured to transmit the trained first Isolation Forest model to the third electronic device 430. The second electronic device 420 comprises an output interface 421 configured to transmit the trained second Isolation Forest model to the third electronic device 430. Accordingly, the third electronic device 430 comprises an input interface 432 configured to receive the first Isolation Forest model from the first electronic device 410 and the second Isolation Forest model from the second electronic device 420.

The third electronic device 430 comprises a third processing circuit 433 configured to combine the first Isolation Forest model and the second Isolation Forest model to obtain a combined Isolation Forest model as described above. Further, the third electronic device 430 comprises an output interface 431 configured to transmit the combined Isolation Forest model to the first electronic device 410 and the second electronic device 420. In some example, the output interface 431 may be configured to transmit the combined Isolation Forest model to only one of the first electronic device 410 and the second electronic device 420

The first electronic device 410 comprises an input interface 412 configured to receive the combined Isolation Forest model from the third electronic device 430. Similarly, the second electronic device 420 comprises an input interface 422 configured to receive the combined Isolation Forest model from the third electronic device 430.

The first processing circuit 411 is configured analyze data at the first electronic device 410 for anomalies using the second Isolation Forest model. Similarly, the second processing circuit 421 is configured analyze data at the second electronic device 420 for anomalies using the second Isolation Forest model.

For example, each of the processing circuits 413, 423 and 433 may be a single dedicated processor, a single shared processor, or a plurality of individual processors, some of which or all of which may be shared, a digital signal processor (DSP) hardware, an application specific integrated circuit (ASIC) or a field programmable gate array (FPGA). Each of the processing circuits 413, 423 and 433 may optionally be coupled to, e.g., read only memory (ROM) for storing software, random access memory (RAM) and/or non-volatile memory.

Each of the input interfaces 412, 422 and 432 as well as each of the output interfaces 411, 421 and 431 may be implemented as a hardware circuit or as a software interface.

The electronic device 410, 420 and 430 may further comprise other hardware—conventional and/or custom.

By combining the Isolation forest models of the electronic devices 410 and 420, the more generic combined Isolation Forest model is obtained and provided to the electronic devices 410 and 420. Therefore, the electronic devices 410 and 420 are capable of detecting more types of anomalies in data.

For example, the proposed technique for anomaly detection may be deployed as an extension of an operating system service such as a firewall, or as a daemon running as a background process. In both cases, it does not need direct control of an interactive user and its interface need not be directly exposed.

The following examples pertain to further embodiments:

(1) A method for generating a combined Isolation Forest model for detecting anomalies in data, the method comprising:
receiving a first Isolation Forest model for detecting anomalies in data from a first electronic device, wherein the first Isolation Forest model is trained at the first electronic device;
receiving a second Isolation Forest model for detecting anomalies in data from a second electronic device, wherein the second Isolation Forest model is trained at the second electronic device; and
combining the first Isolation Forest model and the second Isolation Forest model to obtain the combined Isolation Forest model.

(2) The method of (1), further comprising:
transmitting the combined Isolation Forest model to at least one of the first electronic device and the second electronic device.

(3) The method of (1) or (2), wherein the first Isolation Forest model represents a first plurality of trained decision trees, and wherein the second Isolation Forest model represents a second plurality of trained decision trees.

(4) The method of (3), wherein combining the first Isolation Forest model and the second Isolation Forest model comprises merging the first plurality of trained decision trees and the second plurality of trained decision trees.

(5) The method of (3) or (4), wherein combining the first Isolation Forest model and the second Isolation Forest model comprises compacting at least one of the first plurality of trained decision trees and the second plurality of trained decision trees.

(6) The method of any of (3) to (5), wherein combining the first Isolation Forest model and the second Isolation Forest model comprises pruning at least one of the first plurality of trained decision trees and the second plurality of trained decision trees.

(7) The method of any of (3) to (6), wherein combining the first Isolation Forest model and the second Isolation Forest model comprises:
searching for redundancies in the first plurality of trained decision trees and the second plurality of trained decision trees; and
removing found redundancies from the first plurality of trained decision trees and the second plurality of trained decision trees.

(8) The method of any of (3) to (7), wherein combining the first Isolation Forest model and the second Isolation Forest model comprises:
calculating path lengths for paths from root nodes to end nodes of the first plurality of trained decision trees and the second plurality of trained decision trees;
calculating statistics indicative of a relevance of a respective path for paths exhibiting a path length shorter than a threshold value; and
using the paths for the combined Isolation Forest model for which the statistics indicates that the respective path is relevant.

(9) The method of (8), wherein the threshold value depends on the anomalies to be detected by the combined Isolation Forest model.

(10) The method of any of (1) to (9), wherein at least one of the first electronic device and the second electronic device is an Internet-of-Things, IoT, device.

(11) A method for an electronic device, comprising:
training a first Isolation Forest model for detecting anomalies in data;
transmitting the trained first Isolation Forest model to another electronic device;
receiving from the other electronic device a combined Isolation Forest model for detecting anomalies in data, wherein the combined Isolation Forest model is a combination of the first Isolation Forest model and at least a second Isolation Forest model for detecting anomalies in data; and
analyzing data at the electronic device for anomalies using the combined Isolation Forest model.

(12) The method of (11), wherein the electronic device is an Internet-of-Things, IoT, device.

(13) The method of (12), wherein the other electronic device is a server or a server network.

(14) An apparatus for generating a combined Isolation Forest model for detecting anomalies in data, the apparatus comprising:
an input interface configured to:
receive a first Isolation Forest model for detecting anomalies in data from a first electronic device, wherein the first Isolation Forest model is trained at the first electronic device; and
receive a second Isolation Forest model for detecting anomalies in data from a second electronic device, wherein the second Isolation Forest model is trained at the second electronic device; and
a processing circuit configured to combine the first Isolation Forest model and the second Isolation Forest model to obtain the combined Isolation Forest model.

(15) An electronic device, comprising:
a processing circuit configured to train a first Isolation Forest model for detecting anomalies in data;
an output interface configured to transmit the trained first Isolation Forest model to another electronic device; and
an input interface configured to receive from the other electronic device a combined Isolation Forest model for detecting anomalies in data, wherein the combined Isolation Forest model is a combination of the first Isolation Forest model and at least a second Isolation Forest model for detecting anomalies in data,
wherein the processing circuit is further configured to analyze data at the electronic device for anomalies using the combined Isolation Forest model.

(16) A system comprising:
a first electronic device comprising a first processing circuit configured to train a first Isolation Forest model for detecting anomalies in data;
a second electronic device comprising a second processing circuit configured to train a second Isolation Forest model for detecting anomalies in data; and
a third electronic device comprising:
an input interface configured to receive the first Isolation Forest model from the first electronic device and the second Isolation Forest model from the second electronic device;
a third processing circuit configured to combine the first Isolation Forest model and the second Isolation Forest model to obtain a combined Isolation Forest model; and
an output interface configured to transmit the combined Isolation Forest model to the first electronic device and the second electronic device, wherein at least one of the first processing circuit and the second processing circuit is configured to analyze data at the respective electronic device for anomalies using the second Isolation Forest model.

(17) A non-transitory machine readable medium having stored thereon a program having a program code for performing the method for generating a combined Isolation Forest model according to any of (1) to (10), when the program is executed on a processor or a programmable hardware.

(18) A program having a program code for performing the method for generating a combined Isolation Forest model according to any of (1) to (10), when the program is executed on a processor or a programmable hardware.

(19) A non-transitory machine readable medium having stored thereon a program having a program code for performing the method according to (11) or (12), when the program is executed on a processor or a programmable hardware.

(20) A program having a program code for performing the method according to (11) or (12), when the program is executed on a processor or a programmable hardware.

The aspects and features mentioned and described together with one or more of the previously detailed examples and figures, may as well be combined with one or more of the other examples in order to replace a like feature of the other example or in order to additionally introduce the feature to the other example.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in non-transitory machine readable medium (e.g. a floppy disc, a DVD, a Blu-Ray, a CD, a ROM, a PROM, and EPROM, an EEPROM or a FLASH memory) and so executed by a processor or a programmable hardware, whether or not such processor or a programmable hardware is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for generating a combined Isolation Forest model for detecting anomalies in data, the method comprising:
    receiving a first Isolation Forest model for detecting anomalies in data from a first electronic device, wherein the first Isolation Forest model is trained at the first electronic device;
    receiving a second Isolation Forest model for detecting anomalies in data from a second electronic device, wherein the second Isolation Forest model is trained at the second electronic device;
    wherein the first Isolation Forest model represents a first plurality of trained decision trees, and wherein the second Isolation Forest model represents a second plurality of trained decision trees,
    searching for redundancies in the first plurality of trained decision trees and the second plurality of trained decision trees;
    removing found redundancies from the first plurality of trained decision trees and the second plurality of trained decision trees; and
    combining the first Isolation Forest model and the second Isolation Forest model to obtain the combined Isolation Forest model.

2. The method of claim 1, further comprising:
    transmitting the combined Isolation Forest model to at least one of the first electronic device and the second electronic device.

3. The method of claim 1, wherein combining the first Isolation Forest model and the second Isolation Forest model comprises merging the first plurality of trained decision trees and the second plurality of trained decision trees.

4. The method of claim 1, wherein combining the first Isolation Forest model and the second Isolation Forest model comprises compacting at least one of the first plurality of trained decision trees and the second plurality of trained decision trees.

5. The method of claim 1, wherein combining the first Isolation Forest model and the second Isolation Forest model comprises pruning at least one of the first plurality of trained decision trees and the second plurality of trained decision trees.

6. The method of claim 1, wherein combining the first Isolation Forest model and the second Isolation Forest model comprises:
    calculating path lengths for paths from root nodes to end nodes of the first plurality of trained decision trees and the second plurality of trained decision trees;
    calculating statistics indicative of a relevance of a respective path for paths exhibiting a path length shorter than a threshold value; and
    using the paths for the combined Isolation Forest model for which the statistics indicates that the respective path is relevant.

7. The method of claim 6, wherein the threshold value depends on the anomalies to be detected by the combined Isolation Forest model.

8. The method of claim 1, wherein at least one of the first electronic device and the second electronic device is an Internet-of-Things, IoT, device.

9. A method for an electronic device, comprising:
training a first Isolation Forest model for detecting anomalies in data;
transmitting the trained first Isolation Forest model to another electronic device;
receiving from the other electronic device a combined Isolation Forest model for detecting anomalies in data, wherein the combined Isolation Forest model is a combination of the first Isolation Forest model and at least a second Isolation Forest model for detecting anomalies in data, wherein the first Isolation Forest model represents a first plurality of trained decision trees, and wherein the second Isolation Forest model represents a second plurality of trained decision trees, the combined Isolation Forest model having removed found redundancies from the first plurality of trained decision trees and the second plurality of trained decision trees; and
analyzing data at the electronic device for anomalies using the combined Isolation Forest model.

10. The method of claim 9, wherein the electronic device is an Internet-of-Things, IoT, device.

11. The method of claim 10, wherein the other electronic device is a server or a server network.

12. An apparatus for generating a combined Isolation Forest model for detecting anomalies in data, the apparatus comprising:
an input interface configured to:
receive a first Isolation Forest model for detecting anomalies in data from a first electronic device, wherein the first Isolation Forest model is trained at the first electronic device; and
receive a second Isolation Forest model for detecting anomalies in data from a second electronic device, wherein the second Isolation Forest model is trained at the second electronic device,
wherein the first Isolation Forest model represents a first plurality of trained decision trees, and wherein the second Isolation Forest model represents a second plurality of trained decision trees; and
a processing circuit configured to
search for redundancies in the first plurality of trained decision trees and the second plurality of trained decision trees,
remove found redundancies from the first plurality of trained decision trees and the second plurality of trained decision trees, and
combine the first Isolation Forest model and the second Isolation Forest model to obtain the combined Isolation Forest model.

13. An electronic device, comprising:
a processing circuit configured to train a first Isolation Forest model for detecting anomalies in data;
an output interface configured to transmit the trained first Isolation Forest model to another electronic device; and
an input interface configured to receive from the other electronic device a combined Isolation Forest model for detecting anomalies in data, wherein the combined Isolation Forest model is a combination of the first Isolation Forest model and at least a second Isolation Forest model for detecting anomalies in data, wherein the first Isolation Forest model represents a first plurality of trained decision trees, and wherein the second Isolation Forest model represents a second plurality of trained decision trees, the combined Isolation Forest model having removed found redundancies from the first plurality of trained decision trees and the second plurality of trained decision trees,
wherein the processing circuit is further configured to analyze data at the electronic device for anomalies using the combined Isolation Forest model.

14. A system comprising:
a first electronic device comprising a first processing circuit configured to train a first Isolation Forest model for detecting anomalies in data;
a second electronic device comprising a second processing circuit configured to train a second Isolation Forest model for detecting anomalies in data; and
a third electronic device comprising:
an input interface configured to receive the first Isolation Forest model from the first electronic device and the second Isolation Forest model from the second electronic device, wherein the first Isolation Forest model represents a first plurality of trained decision trees, and wherein the second Isolation Forest model represents a second plurality of trained decision trees;
a third processing circuit configured to
search for redundancies in the first plurality of trained decision trees and the second plurality of trained decision trees,
remove found redundancies from the first plurality of trained decision trees and the second plurality of trained decision trees, and
combine the first Isolation Forest model and the second Isolation Forest model to obtain a combined Isolation Forest model; and
an output interface configured to transmit the combined Isolation Forest model to the first electronic device and the second electronic device,
wherein at least one of the first processing circuit and the second processing circuit is configured to analyze data at the respective electronic device for anomalies using the second Isolation Forest model.

15. A non-transitory machine readable medium having stored thereon a program having a program code for performing the method for generating a combined Isolation Forest model according to claim 1, when the program is executed on a processor or a programmable hardware.

16. A non-transitory machine readable medium having stored thereon a program having a program code for performing the method according to claim 9, when the program is executed on a processor or a programmable hardware.

* * * * *